(12) United States Patent
Lee

(10) Patent No.: US 9,698,619 B2
(45) Date of Patent: Jul. 4, 2017

(54) DEVICE FOR ENERGY MINING

(71) Applicant: Choon Sae Lee, Dallas, TX (US)

(72) Inventor: Choon Sae Lee, Dallas, TX (US)

( * ) Notice: Subject to any disclaimer, the term of this patent is extended or adjusted under 35 U.S.C. 154(b) by 66 days.

(21) Appl. No.: 13/633,100

(22) Filed: Oct. 1, 2012

(65) Prior Publication Data

US 2014/0091977 A1    Apr. 3, 2014

(51) Int. Cl.
*H01Q 9/28* (2006.01)
*H02J 7/02* (2016.01)
*H02J 17/00* (2006.01)

(52) U.S. Cl.
CPC ............. *H02J 7/025* (2013.01); *H02J 17/00* (2013.01)

(58) Field of Classification Search
USPC ......................................................... 343/795
See application file for complete search history.

(56) References Cited

U.S. PATENT DOCUMENTS

| | | | |
|---|---|---|---|
| 2,760,192 A * | 8/1956 | Shanklin | 343/727 |
| 2,878,471 A * | 3/1959 | Butler | 343/763 |
| 2005/0194941 A1* | 9/2005 | Tupper | H02K 31/02 322/29 |

OTHER PUBLICATIONS

"Homopolar Generator," http://en.wikipedia.org.wiki/Homopolar_generator, as archived at https://web.archive.org/web/20100327015244/http://en.wikipedia.org/wiki/Homopolar_generator on Mar. 27, 2010.*

"Schumann Resonances," at archived at https://web.archive.org/web/20100530224314/http://en.wikipedia.org/wiki/Schumann_resonances on May 30, 2010.*

* cited by examiner

*Primary Examiner* — Graham Smith

(57) ABSTRACT

A device for collecting energy has a moving conducting body and with capacitive plates at the edge. When an incoming wave is incident upon the energy collection device, currents are induced on the moving conducting body, in turn having charges accumulated at the capacitive plates that are attached to the edge of the moving conducting body. As the accumulated charges move along with the conducting body, time-varying magnetic field is produced nearby, from which power is collected by various energy collection devices such as inductive and capacitive coupling devices. It is also possible to collect the energy by putting touch brushes on the charge-stored capacitive plates directly. Also the accumulated charges and consequently the amount of collected power are enhanced by applying the external magnetic field to the moving conducting body.

27 Claims, 2 Drawing Sheets

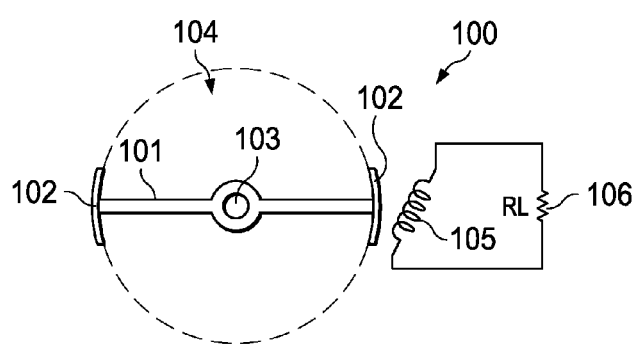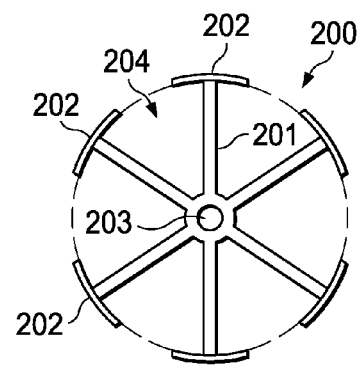
FIG. 1
FIG. 2
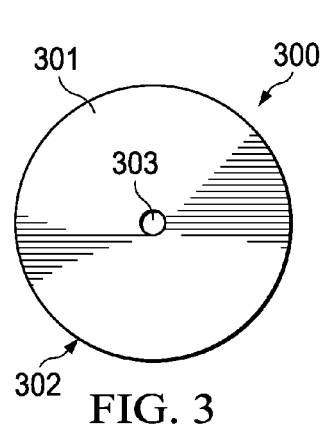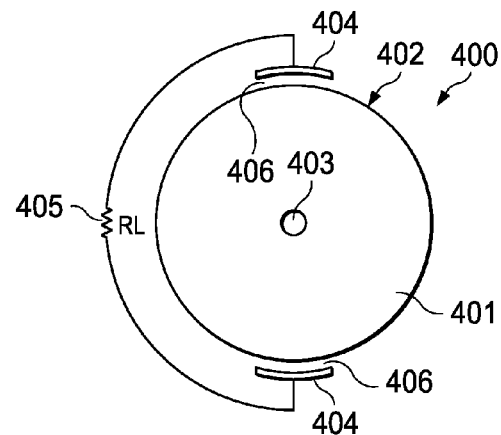
FIG. 3
FIG. 4

DEVICE FOR ENERGY MINING

CROSS-REFERENCES TO RELATED APPLICATIONS

This application claims the benefit of U.S. Provisional Application No. 61/542,905 filed Oct. 4, 2011, and U.S. Provisional Application No. 61/682,148 filed Aug. 10, 2012, both of which applications are hereby incorporated herein by reference, in their entirety.

TECHNICAL FIELD

The invention relates generally to energy collection and, more particularly, to a device for collecting electromagnetic energy from its environment.

BACKGROUND

One major application of this novel device is energy harvesting from its surrounding environment. There are electromagnetic excitations over a wide range of spectrum. In this invention, we select one or group of frequencies from which energy is to be collected. When energy is pumped out from such selected frequency range, there will be a mechanism such that equilibrium is quickly established to restore the original statistical electromagnetic energy distribution. Thus the collected energy comes directly and indirectly from the entire electromagnetic spectrum.

There are many sources for the electromagnetic power in our immediate environment, such as broadcasting stations, base stations for cellular phones, etc. However the power levels of these sources are relatively small. There are another major sources of electromagnetic power in our surrounding area that are both man-made and naturally occurring, especially, at the low frequency spectrum. The power density increases as the frequency decreases as in noise power.

Therefore, what is needed is an apparatus and method for collecting energy from the environment efficiently.

SUMMARY

The device contains moving conducting bodies such as copper, silver or any other good conductors. The conducting body can be a metallic rod as in a dipole antenna, an assembly of multiple conducting rods emanating from the center of the structure, or a simple solid cylinder. Capacitive plates are attached to the edges of the conducting bodies to increase the collected power.

When a plane wave is incident upon the conducting rod, current is induced on the metallic body, and charges will be accumulated near the tips of the rod. The current induced on the conducting rod is similar to that of a dipole antenna excited by an incident plane wave. When the length of the rod is much smaller than the wavelength of the incident wave, the antenna efficiency is small. Consequently most of the captured power is dissipated as heat on the conducting surface. In order to increase the collected power, we consider a metallic rod that is moving in circular motion around the center of the conducting rod. The ends of such a rod contains conducting (capacitive) plates to increase the accumulated charges due to the incident wave as in a short dipole antenna for efficiency improvement. When the frequency of the incoming wave is the same as the rate of revolution of the rotating rod, charge accumulation at the capacitive plates attached to the rod ends is enhanced due to constructive interference as in a resonance. As the rod turns, the induced charges move along with it and electric currents are followed, which in turn produces magnetic field. Energy is collected from such magnetic field using any available methods, such as a coil, capacitive coupler and other electromagnetic coupling devices. The induced voltage charges a battery or is used for other electromechanical devices.

In a stationary conducting rod, there will be currents contributed from the entire frequency spectrum, and the net current and charges collected at the rod ends will be vanishingly small. On the other hand, in a rotating rod, charge accumulation at the capacitive plates attached to the ends of the conducting rod will be enhanced when the rate of revolution is the same as the frequency of the incoming wave, and will produce significant magnetic field when such charges move. Thus the field produced by the moving charges becomes significant in the energy collection scheme when the frequency is equal to the rate of revolution of the conducting rod.

Once the magnetic field is formed by the moving charges, there are various ways to collect the energy. One simple way is to put a number of inductors near the edges of the circular motion to collect electromagnetic power by inductive coupling. The voltage source is produced in a form of electromotive force.

Another way to collect the energy is to place two (or more) conductive plates close to the rotating edges so that there will be capacitive coupling between each stationary plate and the nearby capacitive plate. Those two stationary plates are connected via a load resistor (or lumped load impedance). As the rod rotates, the capacitive plates at the rod ends will be charged by the incoming wave, and these charges will be coupled to the stationary plates, thus giving current to the load resistor (or lumped load impedance). Here only one metallic plate can be placed near the capacitive plates of the moving conducting rod and is connected to the center of the revolving bodies via a load for power collection.

Another method to collect the power is to use a brush (slip ring) as in a Faraday disc. When the capacitive plate at the end of the rotating conducting rod touches the conductive brush, there will be charge transfer between the rod tip and the conductive brush. There will be another brush on the substantially opposite side (with charges opposite in polarity to those of the other). Those two brushes are connected with a load resistor (or a lumped load impedance) to realize power collection. Here only one brush can be placed near the capacitive plates that are attached to the moving conducting bodies and is connected to the center of the revolving bodies via a load for power collection.

Another method to collect the energy is transfer of the charge through a load resistor (or lumped load impedance), located near the center of the conducting rod as in a dipole antenna. Once charges are collected at the edges, as the rod moves, these charges pass through the center device, giving power to it.

In order to increase the collected energy, strong magnetic field can be applied to the moving conducting bodies as in a Faraday disc. There are various ways to increase the collected power using the external magnetic field. One way to enhance the power collection is to apply external magnetic field that is substantially static and substantially perpendicular to the plane that is formed by movement of the conducting bodies, so that the charges in the revolving conducting bodies feel maximum force due to the external magnetic field and the amount of accumulated charges at the capacitive plates (or at the rod ends) is substantially increased. Here any of the power collection devices can be used.

Another possible way is as follows. Here the direction of the magnetic field is perpendicular to the plane of the rod rotation so that the moving charges feel maximum force due to the applied external magnetic field. A half of the conducting rod is under a strong magnetic field while the other half under the field that is opposite in polarity to that of the other. When the frequency of the incoming wave is twice the rate of revolution (or a multiple of the revolution rate), the charge accumulation at the rod ends (or capacitive plates at the edges of the moving conducting bodies) due to the incoming wave is greatly enhanced by the presence of the applied external magnetic field as prescribed above due to resonance.

With magnets attached to the moving body, we can apply static magnetic field with different orientations depending on the regions of the moving rod (or others such as a collection of rods or disc) to amplify the collected power. For example, consider a revolving conducting rod. Two magnets with opposite orientations are placed on the opposite sides of the moving rod to produce magnetic fields of substantially opposite polarizations at the ends of the rod. In order to maximize the resonant condition, the frequency of the incoming wave is preferably the same as the rate of revolution (or a multiple of the revolution rate) of the conducting bodies.

There can be other magnetic field arrangements such that charges can be continuously accumulating at the capacitive plates at the rod ends (or simply rod ends) until the electric force balances with the magnetic force, thus magnifying the power collection from the incoming wave.

As for the energy collection scheme, the methodology is similar to those without external constant magnetic field.

Here the permanent magnet can be replaced by a device such as a coil with externally supplied current.

Also the device for energy mining is explained with a conducting rod as a typical example. However there are varieties derived from this example, such as a number of conducting rods that have a common center location forming radially extended spokes from the center of the device.

Additionally a conducting cylinder is another alternative.

Another possibility is a conducting rod or collection of rods to produce radially extended spokes, with nonconductive materials, such as plastic, that fill among the conducting rods to make the overall shape a cylindrical disc to reduce the air resistance while rotating.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. For instance, the energy collection device of the present invention can be used as either a receiving antenna or transmitting antenna especially at low frequencies where the antenna efficiency tends to be small.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic diagram exemplifying one embodiment for a moving conducting rod with capacitive plates at the rod ends to receive incoming electromagnetic waves and produce strong magnetic fields nearby, and a coil to collect power by inductive coupling in accordance with principles of the present invention;

FIG. 2 is a schematic diagram exemplifying an alternative embodiment to that depicted by FIG. 1, wherein more than one rod are employed in accordance with principles of the present invention;

FIG. 3 is a schematic diagram exemplifying an alternative embodiment to that depicted by FIG. 1, wherein a solid disc replaces the rod in accordance with principles of the present invention;

FIG. 4 is a schematic diagram exemplifying an alternative embodiment to that depicted by FIG. 1, wherein a capacitive coupling scheme is used as an energy collection device in accordance with principles of the present invention;

DETAILED DESCRIPTION

Figure 5:
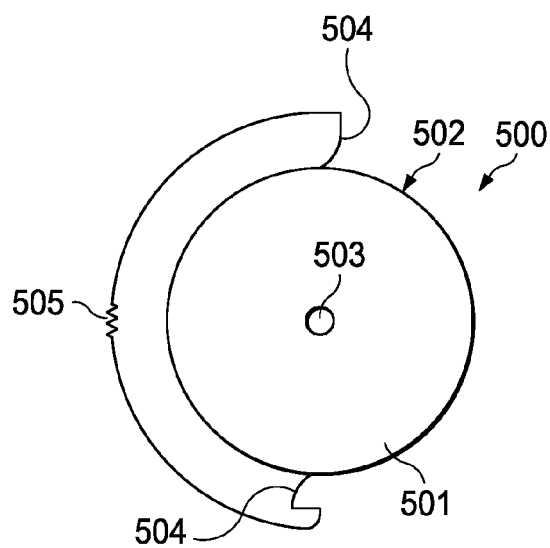
FIG. 5 is a schematic diagram exemplifying an alternative embodiment to that depicted by FIG. 4, wherein touch brushes (slip rings) are used as an energy collection device in accordance with principles of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Further, as used herein, the term "substantially" is to be construed as a term of approximation. For example, "substantially perpendicular" is meant to be that cosine of the deviant angle away from the perpendicular is close to 1. Thus assuming that 1% error is acceptable, the deviant angle has to be less than 8 degrees to have such approximation valid. A "capacitive plate" is used for conducting plate that is placed at the edge of a moving conducting body to accommodate charges that are flown from the moving conductors.

Referring to FIG. 1 of the drawings, the reference numerals 100, generally designate an energy collection device from an incident wave. The energy collection device 100 includes a conducting rod 101 with capacitive plates 102 at the rod ends and a hinge 103 at the rod center, a nonconductive filler 104, and an inductive coil 105 with a load of resistor RL 106 (or lump impedance). The space within circular motion of the rod is filled with a nonconductive material 104 such as plastic to give an overall shape of circular cylindrical disc for minimum air resistance while the rod is in motion.

In operation, when an electromagnetic wave is incident upon the rod 101 which rotates around at the hinge 103, current is induced at the conductor due to the incoming wave as in a dipole antenna and charges are accumulated at the ends. The amount of charges fluctuates depending on the frequency of the incoming wave and the rate of revolution of the conducting rod 101. In order to increase the amount of the accumulated charges, a capacitive plate 102 is attached at each end of the conducting rod. The capacitive plate is substantially flat, and similar to that of a dipole antenna for improvement of radiation efficiency. When the rod 101 rotates, the accumulated charges at the rod ends (or capacitive plates) move to cause magnetic field around its surrounding environment. An inductive coil 105 is placed and oriented near the moving charges to capture maximum magnetic flux from the resultant time-varying magnetic field. The load 106 of resistance RL is connected to the coil 105 to realize power collection. The load 106 may be any wireless device, such as a portable electric generator, an electric car, other wireless devices, or the like. The amount of accumulated charges becomes large when the rate of rotation is a multiple of the frequency of the incoming wave due to resonance. At such resonance, the magnetic field strength becomes large to give high collected power. Especially when the rate of rotation is the same as the frequency of the incoming wave, the accumulated charges will be maximized to give the highest collected power. Here a number of coils can be used to increase the collected power. A circular motion of the conducting rod are given above as an example. However the same principle applies when other types of motion are utilized. In order to reduce the air resistance while rotating, a non-conducting material 104 such as plastic can be placed in the space formed by the rotating rod so that the overall shape of the rotating system becomes a solid cylinder. Also it is possible to have the conducting rod 101 divided near the center and connect those two pieces together with a load RL 106 to realize the power collection as in a dipole antenna.

FIG. 2 depicts a device 200 that is an alternative to the magnetic-field producing components 101, 102, 103, and 104. The alternative device contains more than one conducting rod 201, each of which has capacitive plates 202 at its ends. All the rods have a common center of rotation 203 to increase the field strength nearby due to the accumulated charges at the capacitive plates 202 (or rod ends) that are induced by the incoming wave. The field strength is magnified with the rate of rotation is a multiple of the frequency of the incoming wave. The magnetic field and consequently the collected power are maximized especially when the rotation rate is the same as the incoming-wave frequency. In order to reduce the air resistance while rotating, a non-conducting material 204 such as plastic is placed in the gap space among the conducting rods to form an overall shape of a circular cylinder. Here three rods are shown for purpose of illustration. However any number of rods can be employed to increase the collected power.

FIG. 3 depicts a device 300 that is an alternative to the magnetic-field producing components 101, 102, 103, and 104. The alternative device contains a solid conducting cylinder 301, with a capacitive plate 302 wrapped around its edge and a rotation hinge 303 at the center. As the cylinder rotates around the hinge 303, the magnetic field is produced nearby due to movement of the accumulated charges that are induced at the capacitive plate 302 (or the cylinder edge) by the incoming wave. The field strength is magnified when the rate of rotation is a multiple of the frequency of the incoming wave. The magnetic field and consequently the collected power are maximized especially when the rotation rate is the same as the incoming-wave frequency.

FIG. 4 depicts a device 400 that is an alternative to the energy-collection components 105 and 106. The alternative device contains conducting plates 404 that are close to (but separated by space 406) capacitive plates 402 that are attached to the moving conducting body 401 (which can be any of 101, 201, and 301). The conducting body 401 rotates around the hinge 403. Those conducting plates 404 are connected to a load 405 to realize power collection.

FIG. 5 depicts a device 500 that is an alternative to the energy-collection components 105 and 106. The alternative device contains conducting brushes 504 (slip rings as in a Faraday disc) that touch the capacitive plates 502 (or edges of moving conducting bodies) that are attached to the edges of the moving conductors 501 (which can be any of any of 101, 201, and 301) as in a Faraday disc to extract or inject the induced charges due to the incident wave and movement of the conducting bodies that rotate around the hinge 503. Those conducting brushes are connected to a load 505 to realize power collection. It is also possible that the conducting brushes are attached to the locations on the edge 502 and rotate with the conducting body 501 and the load 505.

Figure 6:
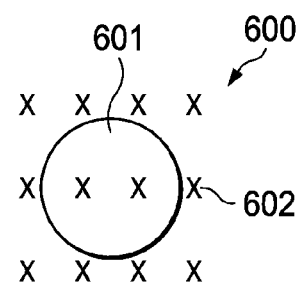
FIG. 6 is a schematic diagram exemplifying one embodiment of use of external magnetic field for enhancement of accumulation of charges at the edges of the moving conducting body of any of the devices depicted by FIGS. 1, 2, 3, 4, and 5 in accordance with principles of the present invention.

FIG. 6 depicts a device 600 that improves energy collection of devices 100, 200, and 300 by adding an extra feature of external magnetic field. The improved device contains the energy collection device 601 (which can be any of devices 100, 200, and 300) and the external magnetic field 602 that is substantially perpendicular to the plane of revolving conductors within the energy collection device 601, and is substantially static. In operation, as the incoming is incident upon the moving conducting bodies, currents are induced and charges are accumulated at the edge points of the rotating bodies. The resultant accumulated charges move with the conducting bodies and feel force due to the external magnetic field that pulls the charges toward the edges (depending on the direction of the magnetic field). Such extra force due to the external magnetic field increases the amount of accumulated charges, resulting in more induced field strength and consequently more collected power. The external magnetic field is supplied by either permanent magnets or coils (or similar devices) with externally supplied current.

Figure 7:
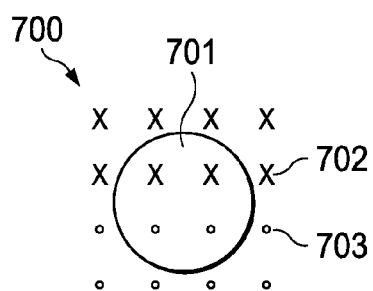
FIG. 7 is a schematic diagram exemplifying an alternative embodiment to that depicted by FIG. 6, wherein different external magnetic field is applied depending on the location within the device in accordance with principles of the present invention.

FIG. 7 depicts a device 700 that is an alternative to the device 600. The alternative device contains the energy collection device 601 (which can be any of devices 100, 200, and 300) and the magnetic field, the direction of which is substantially perpendicular to the direction of movement of the conducting bodies. Here the space where conducting bodies move is divided into two regions. The direction of the external magnetic field 701 in one region is opposite to that of the magnetic field 702 in the other region. When the incoming-wave frequency is twice the rate of revolution (or a multiple of the rate of revolution), the direction of the force on the accumulated charges due to the external magnetic field relative to the direction of the charge movement remains the same after a half cycle of revolution and the amount of accumulated charges at the edge (or the capacitive plate attached to the edge) becomes sum of those due to the incoming wave and the external magnetic field, thus enhancing the induced magnetic field nearby and magnifying the collected power. Here only dividing the region into two is shown for simple illustration. There can be more than two divisions with alternating direction of the external magnetic field with its neighboring regions. If there are N such regions, then the frequency of the incoming wave becomes 2N times the rate of revolution (or a multiple of the rate of revolution) of the conducting bodies for magnified collected power. The external magnetic field is supplied by either permanent magnets or coils (or similar devices) with externally supplied current. It is also conceivable that the external magnetic field is time-dependent. As an example, when the space within the moving bodies is divided in two regions where the directions of the external magnetic field are opposite each other. When the rate of the polarity reversal per unit time in each region is twice the rate of revolution of the moving bodies but the same as the frequency of the incoming wave, charges are accumulated at the capacitive plates (that are attached to the revolving conducting bodies) due to the incoming wave in resonance with those due to the external magnetic field, hence resulting in maximum accumulated charges and consequently enhanced collected power. There could be other ways to increase the collected power with various arrangements of the external magnetic field.

Figure 8:
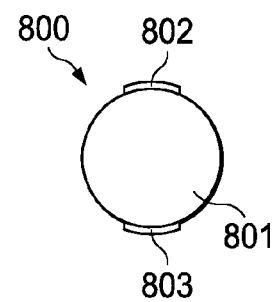
FIG. 8 is a schematic diagram exemplifying an alternative embodiment to that depicted by FIGS. 6 an 7, wherein external magnetic field is applied by permanent magnets (or coils with externally supplied current) in accordance with principles of the present invention.

FIG. 8 depicts a device 800 that is an alternative to the devices 600 and 700. The alternative device contains the energy collection device 801 (which can be any of devices 100, 200, and 300) and the permanent magnets 802 (or any magnetic-field producing devices such as coils with externally supplied current) that are attached to the moving parts within the device 801. The collected power is increased by setting the frequency of the incoming wave equal to the rate of revolution (or a multiple of revolution) of the conducting bodies within the energy collection device 801. Here FIG. 8 illustrates with only two attached magnets. But in practice a multiple of magnetics can be used to increase the power collection by setting the rate of revolution of the conducting bodies and the incoming-wave frequency appropriate for resonance.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A device for collecting energy, said device comprising:
    a plurality of conducting rods concentrically connected to a hinge,
    a first conducting capacitive plate connected to one end of a first one of said conducting rods;
    a second conducting capacitive plate connected to one end of a second one of said conducting rods, wherein said first end and said second end of said conducting rods are aligned wherein said first conducting capacitive plate and said second conducting capacitive plate are substantially facing each other and oppositely charged from each other;
    a first source for generating external fields to said conducting rods;
    a second source for generating electromagnetic waves incident upon said conducting rods;
    a plurality of energy collectors electromagnetically coupled with said conducting rods; and
    a load resistor connected to each of said energy collectors to draw energy from an electromagnetic field excitation generated by said conducting rods.

2. The device of claim 1, wherein the space within movement of said rotating conducting rods is filled with a non-conducting material such as plastic to form a circular cylindrical shape of the moving part to minimize air resistance while rotating.

3. The device of claim 1, wherein each load resistor comprises a lumped impedance or effects of any other devices.

4. The device of claim 1, wherein each rotating conducting rod consists of two pieces connected near its center together with a load resistor for power collection.

5. The device of claim 1, wherein each energy collector consists of touch brushes to take and inject charges from the capacitor plates of the rotating conducting rods.

6. The device of claim 1, wherein an incoming wave from the second source induces currents on moving conducting rods of high conductivities, which in turn cause charges accumulated in first and second capacitor plates of high capacitances at the ends of said rotating conducting rods, which in turn cause magnetic field nearby, from which power is collected.

7. The device of claim 1, wherein the load resistance consists of one of a power generator, an automobile, and any other wireless devices.

8. The device of claim 1, wherein moving conducting rods are under external magnetic field from the first source that is produced by permanent magnets or coils with externally supplied currents.

9. The device of claim 1, wherein the first source produces external magnetic field, the direction of which varies among different regions within the space of movement of said rotating conducting rods, and the external magnetic field is produced by permanent magnets or coils with externally supplied currents.

10. The device of claim 1, wherein the first source produces external magnetic field, the direction of which varies among different regions within the space of movement of rotating conducting rods, the external magnetic field is produced by permanent magnets or coils with externally supplied currents, and the externally produced magnetic field is time-dependent.

11. The device of claim 1, wherein the first source produces external magnetic field is attached to each rotating conducting rod, and the source of the external magnetic field is either permanent magnets, coils with externally supplied current, or any other magnetic-producing devices.

12. The device of claim 1, wherein each energy collector is an inductor.

13. The device of claim 1, wherein the first source does not produce any fields to the rotating conducting rods.

14. The device of claim 1, wherein each load resistor comprises a lumped impedance or effects of any other devices with a rectifier.

15. A device for collecting energy, said device comprising:
    a rotating conducting rod with a hinge located at a center of said rotating conducting rod;

a first conducting capacitive plate placed at a first end of said rotating conducting rod;

a second conducting capacitive plate placed at a second end of said rotating conducting rod, wherein said first conducting capacitive plate and said second conducting capacitive plate are substantially facing each other and oppositely charged from each other;

a first source to produce external fields to said rotating conducting rods;

a second source for generating electromagnetic waves incident upon conducting rods;

a plurality of energy collectors electromagnetically coupled with said rotating conducting rods; and a load resistor connected to each energy collector to draw energy from an electromagnetic field excitation generated by said rotating conducting rod.

16. The device of claim 15, wherein the space within movement of said rotating conducting rod is filled with a non-conducting material such as plastic to form a circular cylindrical shape of the moving part to minimize air resistance while rotating.

17. The device of claim 15, wherein each load resistor comprises a lumped impedance or effects of any other devices.

18. The device of claim 15, wherein the load resistance consists of one of a power generator, an automobile, and any other wireless devices.

19. The device of claim 15, wherein said rotating conducting rod consists of two pieces connected near its center together with a load resistor for power collection.

20. The device of claim 15, wherein each energy collector consists of touch brushes to take and inject charges from the capacitor plates of the rotating conducting rods.

21. The device of claim 15, wherein an incoming wave from the second source induces currents on moving conducting rod of high conductivity, which in turn cause charges accumulated in first and second capacitor plates of high capacitance at the ends of said rotating conducting rod, which in turn cause magnetic field nearby, from which power is collected.

22. The device of claim 15, wherein moving conducting rod is under external magnetic field from the first source that is produced by permanent magnets or coils with externally supplied currents.

23. The device of claim 15, wherein the first source produces external magnetic field, the direction of which varies among different regions within the space of movement of said rotating conducting rod, the external magnetic field is produced by permanent magnets or coils with externally supplied currents, and the externally produced magnetic field is time-dependent.

24. The device of claim 15, wherein the first source produces external magnetic field is attached to said rotating conducting rod, and the source of the external magnetic field is either permanent magnets, coils with externally supplied current, or any other magnetic-producing devices.

25. The device of claim 15, wherein each energy collector is an inductor.

26. The device of claim 15, wherein the first source does not produce any fields to said rotating conducting rod.

27. The device of claim 15, wherein each load resistor comprises a lumped impedance or effects of any other devices with a rectifier.

* * * * *